No. 632,573. Patented Sept. 5, 1899.
F. E. IVES.
PHOTOGRAPHIC CAMERA.
(Application filed May 31, 1899.)

(No Model.) 2 Sheets—Sheet 1.

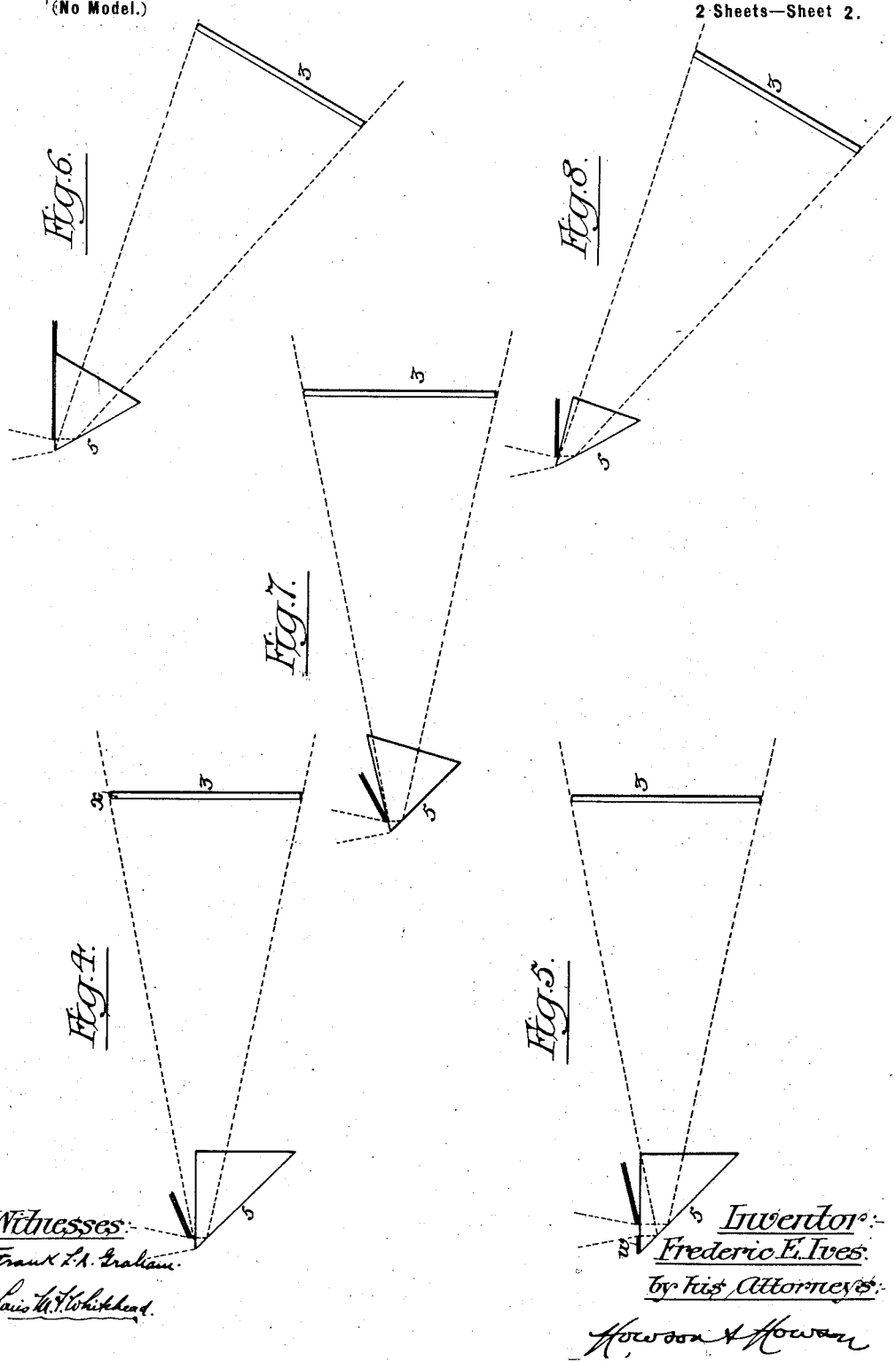

UNITED STATES PATENT OFFICE.

FREDERIC EUGENE IVES, OF PHILADELPHIA, PENNSYLVANIA.

PHOTOGRAPHIC CAMERA.

SPECIFICATION forming part of Letters Patent No. 632,573, dated September 5, 1899.

Application filed May 31, 1899. Serial No. 718,852. (No model.)

*To all whom it may concern:*

Be it known that I, FREDERIC EUGENE IVES, a citizen of the United States, residing in Philadelphia, Pennsylvania, have invented certain Improvements in Photographic Cameras, of which the following is a specification.

The object of my invention is to provide a simple and practical means of producing at one exposure three negatives from points of view so closely juxtaposed as to be practically equivalent to a single point of view for objects not too close to the camera, and thereby obtaining three negatives practically identical in size and perspective without recourse to the transparent reflectors employed in the cameras shown and described in my previous patents, No. 475,084, dated May 17, 1892; No. 531,040, dated December 18, 1894, and No. 546,889, dated September 24, 1895. This object I attain by disposing one of the sensitive plates opposite to the lens-aperture, as in an ordinary camera, and the other two plates one on each side of the central plate, the plates being disposed, preferably, at angles corresponding to the three sides of a hexagon, and I divide the lens-aperture by means of two reflectors, so that some of the light passes between them to the central plate, while a portion of the light is reflected to the right upon one of the other plates and another portion of the light is reflected to the left upon the third plate, thus forming one ordinary and two reversed images practically identical in size and perspective, although not absolutely so, when objects in relief are very close to the camera. By the use of proper color-sensitive plates and color-screens I am thus enabled to produce negative color-records for use in composite heliochromy.

Figure 1:
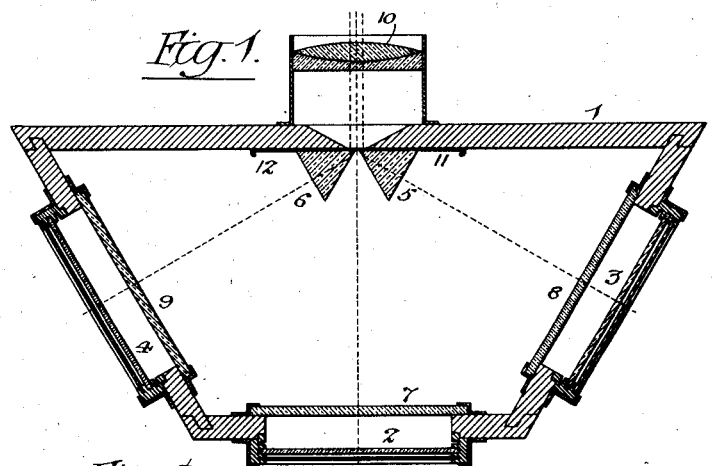
Figure 2:
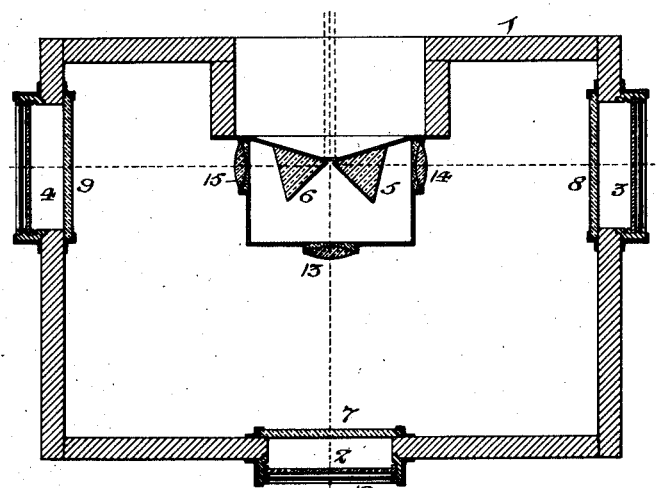
Figure 3:
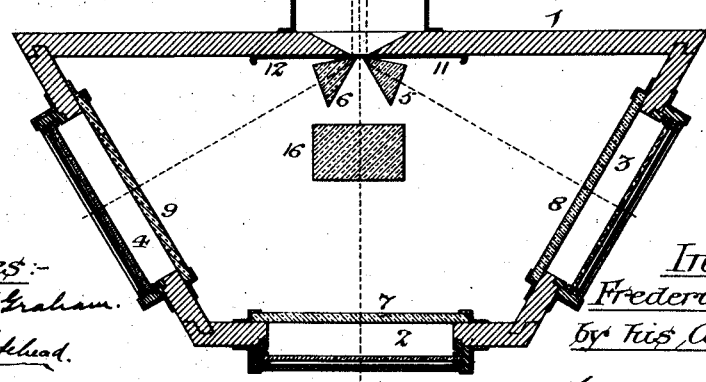

In the accompanying drawings, Figure 1 is a diagrammatic view of a camera constructed in accordance with my invention. Fig. 2 is a similar view illustrating another form of camera embodying the invention. Fig. 3 is a view of a camera similar to that shown in Fig. 1, except as to the character of the reflectors employed; and Figs. 4 to 8, inclusive, are diagrams illustrating the difference between my present invention and the prior state of the art bearing upon the same.

In all of the views of the drawings the camera-box is represented at 1, the three sensitive plates, respectively, at 2, 3, and 4, the two reflectors at 5 and 6, and the color-screens at 7, 8, and 9.

In the camera shown in Figs. 1 and 3 a single lens 10 in front of the aperture in the camera-box is used, and sliding plates 11 and 12 are employed in front of each of the reflectors 5 and 6, so as to limit, as desired, the exposed area of said reflectors, and thereby regulate the amount of light thrown upon the sensitive plates 3 and 4. In the camera shown in Fig. 2 three separate lenses 13, 14, and 15 are used, one of these lenses being placed in the path of the rays which pass directly to the plate 2 and the others being placed in the path of the rays reflected toward the plates 3 and 4. Either of these arrangements may be used with either construction of camera-box, as desired.

The preferable form of reflector is an equilateral prism such as shown in Figs. 1 and 2 of the drawings, said prism being so disposed that the reflected axial ray is perpendicular to the surface of the plate receiving it, as indicated by dotted lines in Figs. 1 and 2, the preferable method of disposing the prisms being that shown in Fig. 1, which provides for the disposition of the three sensitive plates on the three adjoining sides of a hexagon. This disposition of the plates, however, is not necessary, as the specific advantages of my invention may be more or less perfectly secured with the outer plates set at other angles so long as they provide for even illumination by the reflected light. It is possible, for instance, to dispose the three plates at three sides of a rectangle, as shown in Fig. 2, provided the reflecting-surfaces of the equilateral prisms are set at an angle of forty-five degrees to the plane of the camera front, since in this position of the prisms the most deflected rays from the inner edge of the aperture are not cut off, as they would be were rectangular prisms having the reflecting-surfaces placed at the same angle employed. In place of the equilateral prisms rectangular or other prisms may be employed if the plates and the reflecting-surfaces of the prisms are disposed as shown in Fig. 3, such disposition of the reflectors and plates permitting of the arrangement of the three apertures side by side without any break between them in the same manner as when the equilateral prisms are used, whereas if two rectangular prisms were employed with the plates occupying three sides of a rectangle a portion of the inner edge of each prism would have to be covered to secure equal illumination across the reversed images, thereby separating the points of view and impairing the efficiency of the camera. This will be understood on reference to the diagram Figs. 4 and 5.

It will be observed in Fig. 4 that if the rectangular prism is exposed up to the apex a portion of the cone of rays reflected therefrom strikes the front face of the prism and is thereby internally reflected and prevented from reaching the sensitive plate, which is consequently unevenly illuminated, the illumination being least toward the edge $x$ and gradually increasing from that point inward until a fully-illuminated portion is reached. This faulty illumination of the plate has been remedied by blocking off or covering a portion of the exposed area of the prism at or near the apex, as shown at $w$ in Fig. 5, the rays of light being thereby directed farther inward upon the reflecting-surface of the prism, so that no portion of the cone of rays is stopped by the front surface of the prism; but this method of remedying one objection leads to another—namely, the separation of the three apertures—so that the three images produced are from such different points of view that they lack that identity of perspective necessary in three images intended for use in composite heliochromy. In the absence of the shield or cover $w$ light reflected from the portion $y$ of the prism would reach the lower portion of the plate but not the upper portion, and the result would be an uneven illumination of the plate. By the use of equilateral prisms, however, as shown in Figs. 6 and 7, or by the use of a rectangular prism disposed as in Fig. 8, both of these objections are overcome, the full and substantially uniform illumination of the plate being secured, and the three sections into which the light-admitting aperture may be said to be divided immediately adjoining each other, so that each of the produced images is substantially identical in size and perspective.

My present camera is simpler in construction and easier to adjust and keep in order than those described in my former patents.

In order to compensate for the lengthening of focus resulting from the passage of the light rays through the prisms, I may dispose the plate 2, which receives the direct rays closer to the aperture than the other plates, or I may insert in the path of the direct rays a plate of glass of the same thickness as the prisms, as shown, for instance, at 16 in Fig. 3.

By the adjustment of the screening-plates 11 and 12 I may govern the amount of light transmitted to each plate, so as to provide for uniform exposure of the plates—that is to say, the amount of light passing through the red screen may be greater than that passing through the green screen, and the amount of light passing through the latter may be greater than that passing through the blue screen.

Having thus described my invention, I claim and desire to secure by Letters Patent—

1. A camera having a lens or lenses, means for exposing three sensitive plates, and reflectors placed on opposite sides of the light-admitting aperture so as to divide said aperture into a central portion through which the light directly passes, and side portions immediately adjoining said central portion from which the light is reflected, substantially as specified.

2. A camera having a lens or lenses, means for exposing three sensitive plates, and prisms disposed on opposite sides of the light-admitting aperture so as to divide the same into a central portion through which the light directly passes, and closely-adjoining side portions from which the light is reflected by the prisms, substantially as specified.

3. A camera having a lens or lenses, means for exposing three sensitive plates, and a pair of equilateral prisms disposed on opposite sides of the light-admitting aperture whereby a portion of the light passes directly to one of the plates and other portions are reflected to the other plates by means of said prisms, substantially as specified.

4. A camera having a lens or lenses, means for exposing three sensitive plates, a pair of reflectors disposed on opposite sides of the light-admitting aperture so as to divide the same into a central direct transmission-aperture and closely-adjoining reflecting side apertures, and adjustable shields whereby the amount of light admitted to each of the reflectors may be governed, substantially as specified.

5. A camera having a lens or lenses, means for exposing three sensitive plates, color-screens for each of said sensitive plates, and reflectors disposed on opposite sides of the light-admitting aperture of the camera, whereby said light-admitting aperture is divided into three closely-adjoining portions, the light passing directly through the central portion and being reflected from the side portions, substantially as specified.

In testimony whereof I have signed my name to this specification in the presence of two subscribing witnesses.

FREDERIC EUGENE IVES.

Witnesses:
 EDWD. RAMSEY,
 F. E. BECHTOLD.